Nov. 16, 1937. A. H. BLOHM 2,098,941
PROJECTION SYSTEM
Original Filed March 8, 1930 3 Sheets-Sheet 1
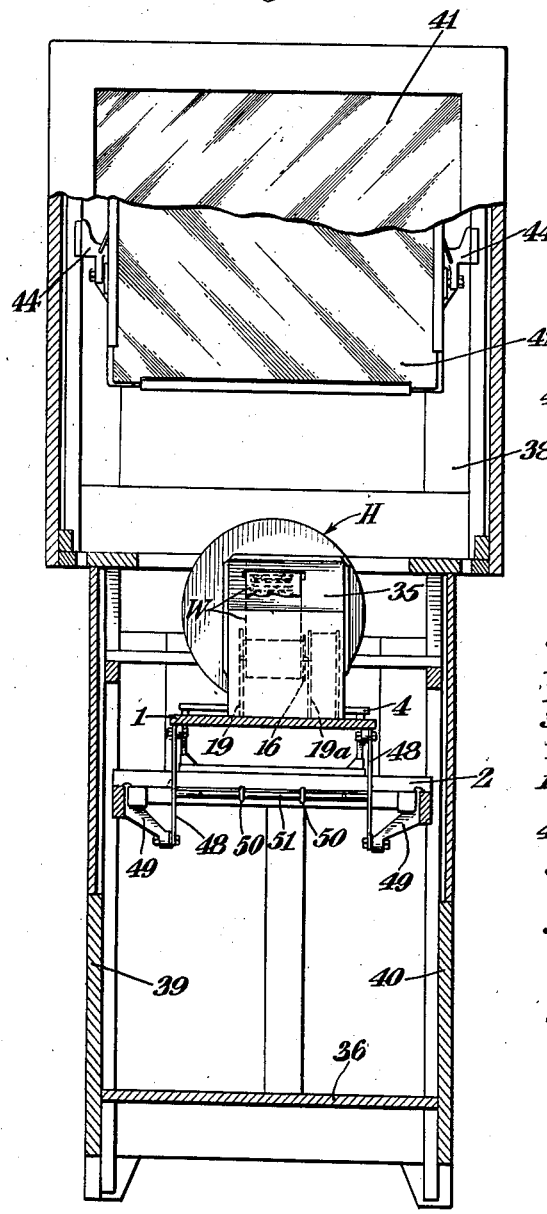
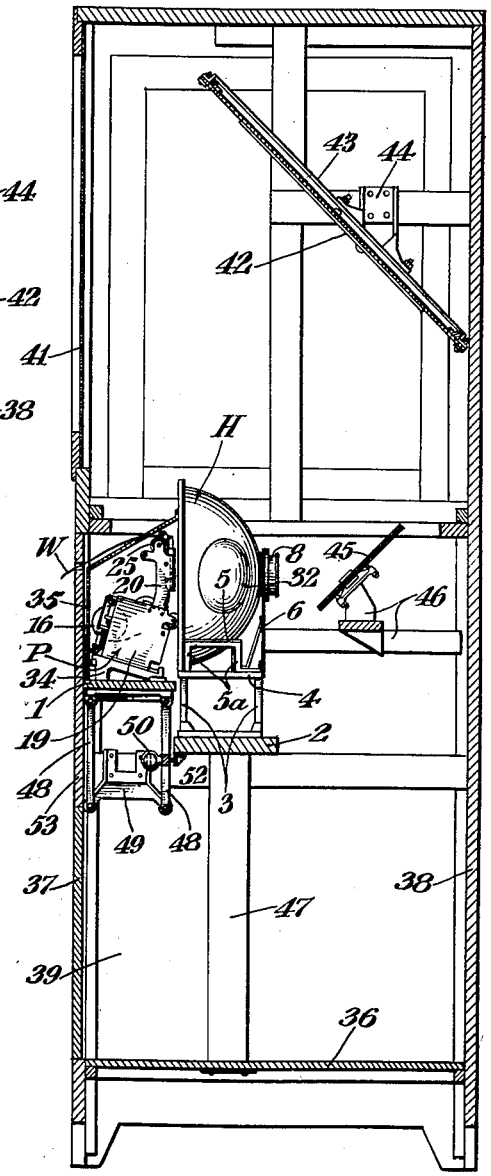
INVENTOR
August H. Blohm
BY Ward, Crosby & Neal
ATTORNEYS

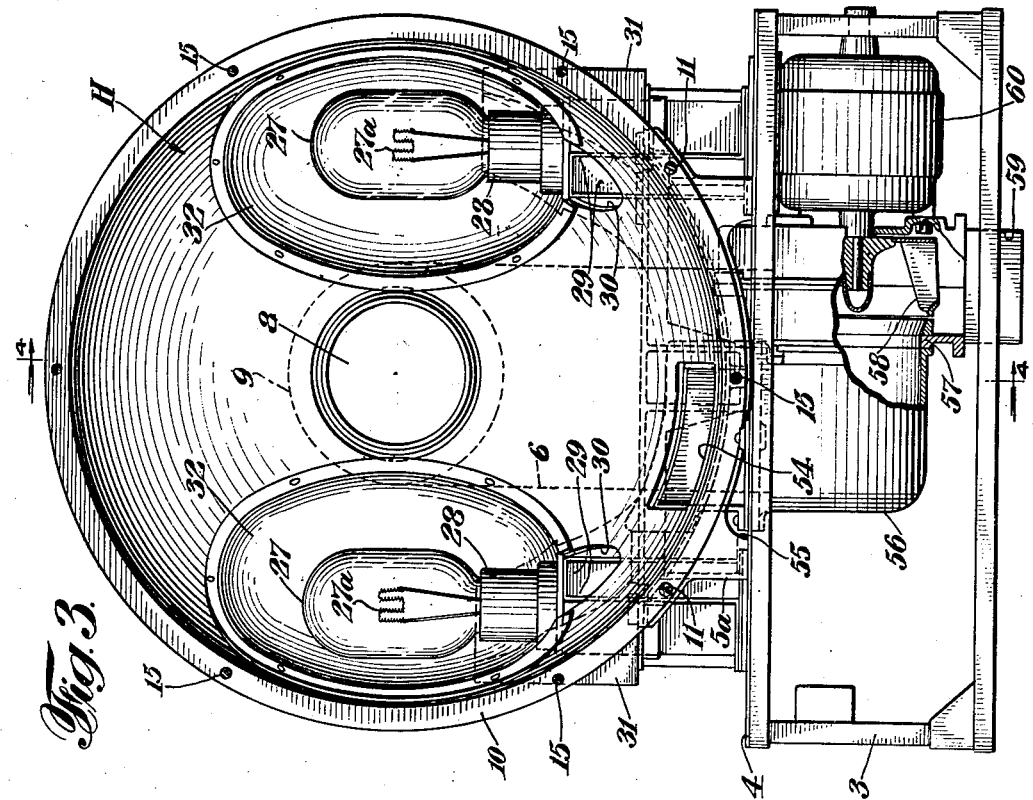
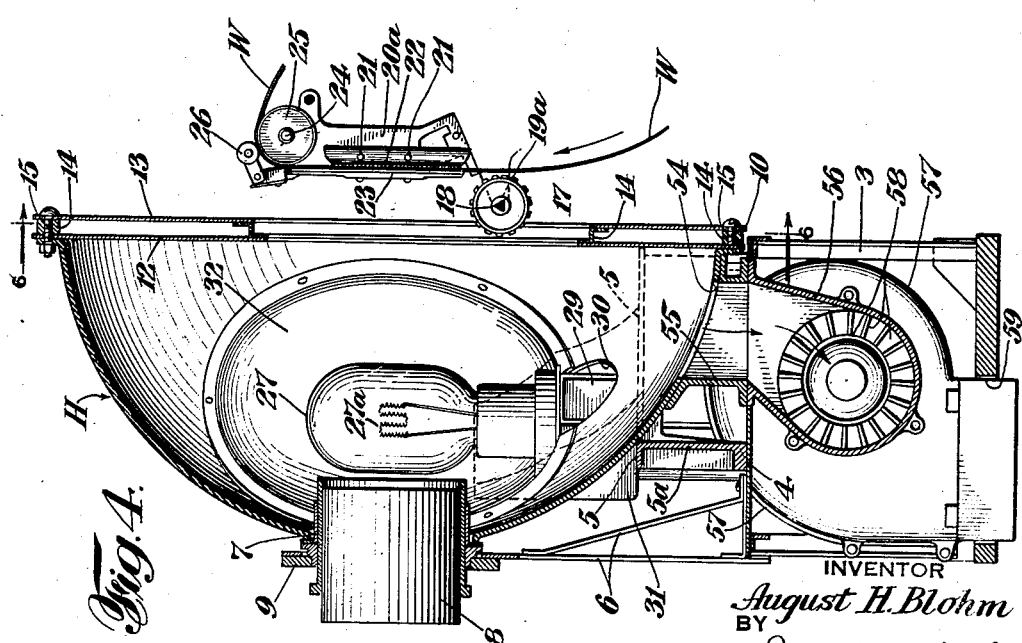

Nov. 16, 1937.  A. H. BLOHM  2,098,941
PROJECTION SYSTEM
Original Filed March 8, 1930  3 Sheets-Sheet 3
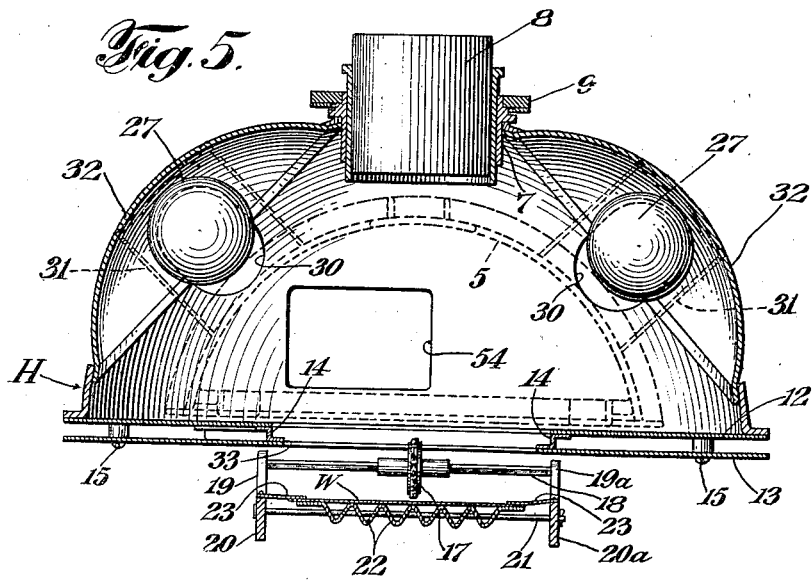
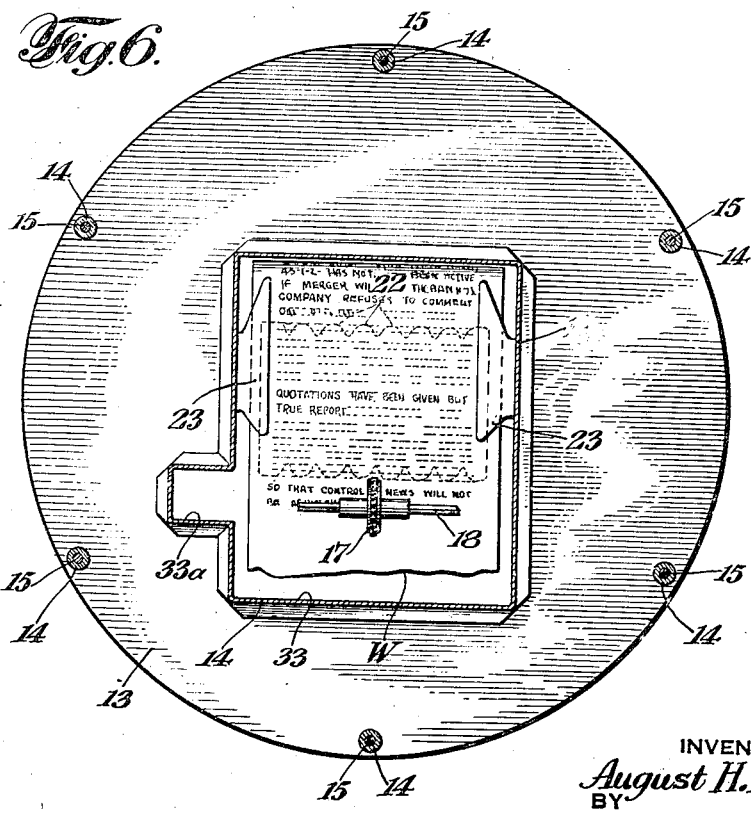
INVENTOR
August H. Blohm
BY
Ward, Crosby & Neal
ATTORNEYS Patented Nov. 16, 1937

2,098,941

UNITED STATES PATENT OFFICE 2,098,941

PROJECTION SYSTEM

August H. Blohm, Chicago, Ill., assignor to Trans-Lux Corporation, a corporation of Delaware Application March 8, 1930, Serial No. 434,273
Renewed April 24, 1935

REISSUED

12 Claims. (Cl. 88—24)

My invention relates to a projection system utilizable for any desired purpose such, for example, as one wherein images of printed characters on a tape or web are projected onto a screen.

My invention relates to a projection system wherein light from a suitable source coacts with a tape, web, sheet or the like to produce an illuminated area in the field of a projection or objective lens.

Various other objects, advantages and characteristics of my invention will become apparent from the following description taken in connection with the accompanying drawings.

For an understanding of my invention and for an illustration of one of the many forms thereof, reference is to be had to the accompanying drawings in which Figure 1 is a vertical sectional view, partly in elevation and with parts omitted, of a projecting system constructed in accordance with my invention;

Fig. 2 is a transverse, vertical sectional view, partly in elevation, of the arrangement shown in Fig. 1;

Fig. 3 is an enlarged elevational view, partly broken away, looking from right to left of Fig. 4 immediately beyond the member 12;

Fig. 4 is an enlarged transverse, vertical sectional view, partly in elevation, and is taken on the line 4—4 of Fig. 3 looking in the direction of the arrows;

Fig. 5 is an enlarged horizontal sectional view, partly in plan, of the arrangement in Figs. 3 and 4; and Fig. 6 is an enlarged vertical sectional view, partly in elevation, and is taken on the line 6—6 of Fig. 4 looking in the direction of the arrows.

In general, one prominent application of my invention relates to a projection system wherein images are projected onto a suitable screen of the characters printed by suitable mechanism on a tape, web, sheet or the like hereinafter generically termed a "tape" or "web".

Referring to the drawings for a more specific description of my invention, I and 2 represent supports of any suitable character, the former having suitable printing mechanism P resting thereon, and the latter carrying a suitable lamp housing H which may be formed of sheet metal or other suitable material.

As shown although not necessarily, the support 2 may have standards 3 upstanding therefrom, said standards carrying a table or plate 4 upon which a saddle 5 and a standard 6 are suitably secured.

As illustrative of one of the many forms of my invention, the housing H is herein shown as of generally spherical configuration and is apertured for the reception of a sleeve 7 which adjustably supports the housing of an objective or projection lens 8. The aforesaid standard 6 is provided, adjacent its upper end, with an opening through which said sleeve 7 extends, the sleeve having a shoulder between which and a nut 9 the adjacent surface of the standard 6 is received, the nut 9 being threaded or otherwise suitably secured to said sleeve 7.

The aforesaid saddle 5 has legs 5a resting upon and secured to the plate 4. The housing H has line contact with the upper part of the saddle 5 as illustrated in Fig. 4, while the flanged edge 10 of said housing H abuts at its inner lower surface against the lower flanged saddle surface, the two flanges being secured together by screws 11 or the like, Fig. 3.

By virtue of the arrangement just described in connection with the saddle 5 and standard 6, the housing H is securely held in position on the plate 4 as shown in Fig. 4.

As stated, the housing H may present a spherical surface and, as herein illustrated, it is approximately half of a hollow sphere. The opening receiving the sleeve 7 is preferably so located that the longitudinal axis of the objective lens 8, when extended, intersects the center of the opening defined by the aforesaid housing flange 10.

Preferably, the opening in the housing H opposite the objective lens 8 is partially closed and, for the purpose, there may be utilized the plates 12 and 13 suitably maintained in spaced relation, as by members 14, bolts 15 or the like retaining the plates 12 and 13 to the housing flange 10.

The hereinbefore specified printing mechanism P may be of any suitable character. Ordinarily, however, it is such as prints information in lineform on a web or the like and, more specifically, although not necessarily, such mechanism is herein illustrated as of the type known to the art as a "Burry" printer.

A printer of this character has associated therewith a roller 16 having wound thereon a web W of paper or the like which is gradually unwound and moved step-by-step along a path; in so doing, different sections of the web W in succession come immediately adjacent a printing wheel 17 movable back and forth along a shaft 18 rotatably mounted in the side plates 19, 19a of the printing mechanism, said wheel 17 having characters distributed peripherally therearound.

In accordance with my invention, the web W is moved through a projection field or zone whereby images of the characters printed thereon by the wheel 17 are projected onto suitable screen structure. As illustrative of one of the many suitable arrangements which may thus be utilized, there is disposed on the frame of the printing mechanism a frame comprising the side plates 20, 20a maintained in spaced relation in any suitable manner, as by the rods 21 connected thereto. Between the side plates 20, 20a, there is disposed a backing plate 22 which may be corrugated or of undulating character as shown particularly in Figs. 5 and 6. As herein illustrated although not necessarily, the backing plate 22 is supported by some of the tie rods 21.

Referring to Figs. 5 and 6, the side plates 20 and 20a are shown respectively as carrying sheet-like members 23, preferably of resilient material which extend toward each other and are inherently biased toward the backing plate 22. The web W, when traversing the projection field, passes, at opposite edges thereof, between the backing plate 22 and the respective members 23.

As illustrated particularly in Fig. 4, a shaft 24 is shown as rotatably mounted in the side plates 20, 20a, said shaft carrying a plurality of web-feeding rollers 25, each of which has an idle roller 26 coactable therewith whereby the web is firmly gripped between the sets of rollers 25, 26 and moved in the intended direction when said rollers 25 are suitably actuated.

The web-feeding arrangement described above in a general sense is more specifically described in my copending application Ser. No. 434,272, filed March 8, 1930 wherein it is shown that the rollers 25 partake of a step of movement each time that the printing wheel 17 is returned to its initial position. It shall be understood, however, that my invention is not to be limited to a web-feeding arrangement of the character outlined above since the example illustrated is one only of the many forms that are suitable for the intended purpose.

Disposed within the housing H is any suitable source of light which is herein illustrated as comprising a plurality of lamp bulbs 27 each having a filament 27a adapted to be brought to incandescence. Each bulb 27 is received by a socket 28, each socket being carried by a supporting member 29 resting upon the plate 4. As shown in Figs. 3 and 4, the housing H is provided with suitable apertures 30 so that the respective supporting members 29 may extend therethrough. To prevent leakage of light through the apertures 30, the housing H on its exterior surface, may carry boxes 31 which fit around the respective apertures 30 so as to close the same against egress of light. It shall be understood, however, that any other suitable light shielding arrangement may be utilized in lieu of that just described.

If desired, the interior surface of the housing H may be suitably light-reflecting or, alternately and as shown, said housing H may be formed with apertures in which the light-reflecting members 32 are received respectively.

As shown particularly in Figs. 4, 5, and 6, the aforesaid plates 12 and 13 have an aperture 33 which, in effect, is the "picture aperture" because it is this aperture through which the light passes from the interior of the housing H to illuminate a given section of the web W. Obviously, the longitudinal axis of the objective lens 8, when extended, should intersect or approximately intercept the center of the aforesaid aperture 33 and the web path should be so chosen as to be symmetrical therewith as illustrated in Fig. 6, for example.

As shown in Fig. 2, the printing mechanism P may be disposed upon the inclined surface of a member 34 resting upon the support 1. This arrangement is neither essential nor necessary and was adopted merely for convenience in connection with the vertical disposition of the web W, as it passes through the projection field. Further as illustrated in Fig. 2, a light-shielding housing 35 having front, top and side walls, should be disposed about the printing mechanism P, said housing 35 being also disposed about the herein described upper extension of the printing mechanism which comprises the side plates 20, 20a. The web W after leaving the feeding rollers 25 may pass through a slot formed in the top wall of housing 35, Fig. 2.

As herein illustrated, the projection system is housed within a cabinet. It shall be understood, however, that the use of a cabinet is optional since it may be dispensed with when desired. If utilized, the cabinet may be formed somewhat as herein illustrated where it is shown as comprising a suitably supported base 36 from which upstands front and rear walls 37 and 38 together with side walls 39 and 40. The front cabinet wall 37 may be apertured to receive a screen 41 of suitable translucent material such as is adapted for "through" projection or projection of that character wherein the light comes to the eyes of the audience after passing through the screen. Coactable with the screen 41 to pass light directly thereto, is a mirror 42 carried by a suitable member 43 which is secured to the cabinet side walls by brackets 44, if desired. Coactable with the mirror 42 to pass light directly thereto, is a second mirror 45 carried by a suitable supporting device 46 disposed interiorly of and suitably secured to interior cabinet surfaces.

When a given section of the web W is before the aperture 33, light passes thereto from the incandescent filaments 27a and is concentrated thereon by the reflectors 32. As a result, said given web section is highly illuminated and, by reflection therefrom, a light beam passes through the objective lens 8, is reflected by the mirrors 45 and 42 and then coacts with the screen 41 whereby images are displayed thereon of the characters on said given web section.

The interior surface of the lamp housing H may be brought to a suitable reflecting condition, as by the application of white paint, to enhance its reflecting characteristics. This is advantageous because said housing H, due to its spherical shape, is adapted for reflection of light to and through the picture aperture.

Further, the surface of the backing plate 22, adjacent the web W, may be suitably painted or otherwise brought to a high reflecting condition whereby the efficiency of the system is increased.

The utilization of the light housing 36 is especially desirable because almost entirely preventing the passage of undesired light into the immediate vicinity of the web section under illumination from the lamp housing H.

As will be observed from Fig. 6, the printing wheel 17 is within the field of the objective lens 8, that is, said printing wheel 17 operates within the picture aperture 33. Accordingly, operation of the printing wheel 17 may be observed on the screen 41. With such an arrangement, an observer obtains information concerning any matter substantially coincidentally with the printing thereof. Should it be desirable that the arrangement be such that operation of the printing wheel 17 may not be observed, the picture aperture 33 may be so arranged and of such area that said wheel 17 is not within the limits thereof.

Where the arrangement is as illustrated, the plates 12 and 13 may be formed with a supplementary aperture 33a, Fig. 6, to permit travel of the printing wheel 17 along its desired path.

Where the web W moves step-by-step as hereinbefore described, it will be clear that each line of printed matter moves step-by-step along the picture aperture and eventually disappears from view at the far side thereof. Simultaneously a line image of each line of printed matter moves step-by-step from bottom to top of the screen 41 and eventually passes from view at the top thereof.

The aforesaid support 2 may be supported within the cabinet in any suitable manner. For example, it may rest upon standards 47 upstanding from the cabinet base 36, Fig. 2. Likewise, the aforesaid support 1 may be supported within the cabinet in any suitable manner. As herein illustrated, it is thus supported in such manner that it may be swung to an exterior position, the printing mechanism P moving therewith so that the latter may readily be inspected or repaired. To this end, members 48 may be pivoted to the support 1 and to brackets 49 suitably and firmly secured in position interiorly of the cabinet.

The support 1 may be suitably retained in its interior position, as by thumb screws 50 passing through a member 51 carried by the inner pair of links, said thumb screws being threaded into a member 52 depending from the support 2. Upon opening a door or removing a panel 53 of the cabinet, the thumb screws 50 may be removed to permit outward swinging movement of the support 1, and the mechanism carried thereby until movement is arrested if desired, by suitable stop mechanism not shown, the support 1 remaining horizontal during such movement.

With some arrangements where the lamp bulbs 27 are of high rating and, therefore, such as generate a large amount of heat, it may be desirable to ventilate or cool the lamp housing H. Under such conditions, an arrangement as illustrated particularly in Figs. 3 and 4 may be utilized, if desired. As therein shown, the housing H is provided with an aperture 54 placed, by a conduit 55, in communication with a second conduit 56 which opens into a casing 57 in which a suitable blade-carrying rotor 58 is mounted in any suitable manner, the casing 57 having a passage 59 leading to the atmosphere. For rotating the rotor 58 at high speed within the casing 58, a motor 60 may be utilized, the armature 60 of the motor driving the fan rotor 58.

The parts last described may be assembled in any suitable manner. As shown, the conduit 55 terminates, at one end, in a flange for connection to the housing H. The other flanged terminal of conduit 55 is connected to a similar flanged end section of conduit 56, the plate 4 being suitably apertured to permit extension therethrough of the conduit structure comprising the conduits 55 and 56. The other flanged end section of conduit 56 is suitably connected to the casing 57 which, together with the motor 60, are suitably supported beneath the plate 4.

The rotor 58 is operated in the proper direction to draw air from the lamp housing H through the conduits 55 and 56 in the direction of the arrow, as shown in Fig. 4. Since the housing H is substantially closed practically all of the replacement air passes thereinto by way of the aperture 33 in the plates 12 and 13. This is highly advantageous because the entering stream of cold air passes closely adjacent and cools the illuminated section of the web W which ordinarily is formed from paper or other inflammable material and might otherwise be heated to the point of combustion under the influence of heat generated by the lamps 27.

The disclosed ventilating arrangement is advantageous because the cold or cooler replacement air enters the housing H by way of the picture aperture. Accordingly, the section of the web W in the projection field is more efficiently cooled than if air which had been heated within the housing H was passed to the atmosphere through the picture aperture.

Although my invention has been described in connection with a reflecting projection system, it shall be understood that, as regards some features thereof, the invention is applicable to systems wherein the projecting light beam passes through the tape.

While the invention has been described with respect to certain particular examples which give satisfactory results, it will be understood by those skilled in the art, after understanding the invention, that various changes and modifications may be made without departing from the spirit and scope of the invention, and it is intended, therefore, in the appended claims to cover all such changes and modifications.

What is claimed as new and desired to be secured by Letters Patent, is:

1. In combination, a device for printing characters in line form on a web, means for feeding said web through a projection field, means cooperating with said field to obtain images of said characters, a housing for at least a part of said second named means, and a housing for said device, said web extending from said projection field through said second housing and passing exteriorly thereof through a slot formed in a wall thereof.

2. In combination, a printing device having a rotatable type wheel movable transversely of a traveling web to print lines of information thereon, a housing having an opening, a source of light in said housing, an objective lens in said housing opening, the path of said web being disposed at the side of said housing opposite said opening, light passing from said source to said web and being reflected by said web through said objective lens, a screen, and means comprising a mirror system and said objective lens for producing on said screen images of the printed lines with the character images in normal upright relation.

3. The combination with a device for printing characters on a web, of means defining a projection field with respect to which said web is movable after passage thereof from said device, web-guiding means projecting from and carried by said device, web-pulling means carried by that end of said web-guiding means toward which said web is traveling, and a motor for operating said web-pulling means.

4. In combination, a device for printing characters on a web, means defining a projection field with respect to which said web is movable after passage thereof from said device, said means comprising web-guiding mechanism projecting from and carried by said device, a source of light for illuminating said projection field, means for movably supporting said device whereby said projection field may be moved at will from and returned to normal projecting position in the path of the projecting light beam, and stop means for determining said normal projecting position of said projection field.

5. In combination, a cabinet, a device for printing characters on a web, means defining a projection field with respect to which said web is movable after passage thereof from said device, said means comprising web-guiding mechanism projecting from and carried by said device, a movable support for said device whereby the latter together with said web-guiding mechanism may be temporarily positioned without said cabinet, and stop means for positioning said movable support interiorly of said cabinet in predetermined relation with respect to said projection field.

6. The combination with a cabinet having a door movable to open position, of a projector mounted in part at least interiorly of said cabinet, a printing device mounted in said cabinet, means for mounting said printing device for movement with respect to said projector whereby said printing device may be positioned exteriorly of said cabinet when said door is open, and stop means for positioning said printing device interiorly of said cabinet in predetermined relation with respect to said projector.

7. In combination, a device for printing characters on a web, a motor for operating said device, a device for projecting images of the printed characters, means operated by said motor for pulling said web through said projecting device, means whereby said printing device and said motor may be moved at will and as a unit from and returned to normal position with respect to said projecting device, and stop means for positioning said printing device and said motor interiorly of said cabinet in predetermined relation with respect to said projecting device.

8. In combination, a device for printing characters on a web, a motor for operating said device, means defining a projection field with respect to which said web is movable after passage thereof from said device, web-pulling means at the end of said projection field toward which said web is travelling, means for operating said web-pulling means by said motor, means whereby said printing device and said motor may be moved at will and as a unit from and returned to normal position with respect to said projection field, and stop means for positioning said printing device and said motor interiorly of said cabinet in predetermined relation with respect to said projection field.

9. In combination, a printing device having guiding means disposed transversely of a web, printing means movable along said guiding means for printing information on a stationary section of the web in line form, relative movement being effected between said printing means and said web to bring them into engagement each time that a character is printed, means for drawing said web upwardly through a projection field disposed in part at least at a higher level than said printing means, said web, while passing through said projection field, being disposed substantially vertically, the characters on that section of the web in the projection field at any given time being so arranged as to form horizontal lines one above the other, and means comprising a projecting system for projecting images of said horizontal lines of characters onto a screen, the images of the characters on said screen being so arranged as to form horizontal lines, said horizontal lines of images moving upwardly across said screen in correspondence with movement of the web through said projection field.

10. In combination, a printing device having guiding means disposed transversely of a web, printing means movable from an initial position along said guiding means for printing information on a stationary section of the web in line form, relative movement being effected between said printing means and said web to bring them into engagement each time that a character is printed, means for drawing said web upwardly through a projection field disposed in part at least at a higher level than said printing means, said web, while passing through said projection field, being disposed substantially vertically, the characters on that section of the web in the projection field at any given time being so arranged as to form horizontal lines one above the other, and means comprising a projecting system for projecting images of said horizontal lines of characters onto a screen, the images of the characters on said screen being so arranged as to form horizontal lines, said horizontal lines of images moving upwardly across said screen in correspondence with movement of the web through said projection field, said drawing means operating to move the web with respect to said projection field each time that the printing means returns to initial position.

11. In combination, a printing device having means movable transversely with respect to a web to print information on a stationary section thereof in line form, means for drawing said web upwardly through a projection field disposed in part at least at a higher level than said printing means, said web, while passing through said projection field, being disposed substantially vertically, the characters on that section of the web in the projection field at any given time being so arranged as to form horizontal lines one above the other, and means for producing a projecting light beam which travels from said projection field along a path disposed substantially horizontally, said printing device being readily movable to a servicing position while the means for producing said projecting light beam remains stationary.

12. In combination, a printing device having means movable transversely with respect to a web to print information on a stationary section thereof in line form, means for drawing said web upwardly through a projection field disposed in part at least at a higher level than said printing means, said web, while passing through said projection field, being disposed substantially vertically, the characters on that section of the web in the projection field at any given time being so arranged as to form horizontal lines one above the other, means for producing a projecting light beam which travels from said projection field along a path disposed substantially horizontally, an objective lens focused upon said projection field, and guiding means for readily moving said printing device to a servicing position.

AUGUST H. BLOHM.